United States Patent
Dunn et al.

(10) Patent No.: US 9,146,986 B2
(45) Date of Patent: Sep. 29, 2015

(54) SYSTEMS, METHODS, AND APPARATUSES FOR IMPLEMENTING AN INTERFACE TO VIEW AND EXPLORE SOCIALLY RELEVANT CONCEPTS OF AN ENTITY GRAPH

(71) Applicant: FACEBOOK, INC., Menlo Park, CA (US)

(72) Inventors: Jeffrey Dunn, Seattle, WA (US); Cameron Marlow, Menlo Park, CA (US); Venkataramanan Nandagopal, Sunnyvale, CA (US); Philip Bohannon, Cupertino, CA (US)

(73) Assignee: FACEBOOK, INC., Menlo Park, CA (US)

( * ) Notice: Subject to any disclaimer, the term of this patent is extended or adjusted under 35 U.S.C. 154(b) by 130 days.

(21) Appl. No.: 13/828,792

(22) Filed: Mar. 14, 2013

(65) Prior Publication Data

US 2014/0280108 A1 Sep. 18, 2014

(51) Int. Cl.
*G06F 17/30* (2006.01)
*G06Q 50/00* (2012.01)

(52) U.S. Cl.
CPC .......... *G06F 17/30699* (2013.01); *G06Q 50/01* (2013.01)

(58) Field of Classification Search
CPC ................... G06F 17/30699; G06F 17/30867; G06F 17/3095; G06F 17/30386; G06F 17/30035; G06F 17/30587; G06Q 50/01; G06Q 30/0255; G06N 5/02; G06N 99/005; H04L 67/02; H04L 67/42
USPC ......... 707/797, 798, 748, 736, 755, 769, 770; 1/1; 345/440; 706/12
See application file for complete search history.

(56) References Cited

U.S. PATENT DOCUMENTS

| | | | | |
|---|---|---|---|---|
| 8,180,804 | B1 * | 5/2012 | Narayanan et al. | 707/798 |
| 8,185,558 | B1 * | 5/2012 | Narayanan et al. | 707/798 |
| 8,204,904 | B2 * | 6/2012 | Bonchi et al. | 707/776 |
| 8,443,005 | B1 * | 5/2013 | Goldman et al. | 707/798 |
| 8,583,659 | B1 * | 11/2013 | Alexandrescu et al. | 707/748 |
| 8,676,857 | B1 * | 3/2014 | Adams et al. | 707/798 |
| 2008/0275861 | A1 * | 11/2008 | Baluja et al. | 707/5 |
| 2010/0312644 | A1 * | 12/2010 | Borgs et al. | 705/14.55 |
| 2011/0264736 | A1 * | 10/2011 | Zuckerberg et al. | 709/204 |
| 2012/0317121 | A1 * | 12/2012 | Fuchs et al. | 707/741 |
| 2013/0018954 | A1 * | 1/2013 | Cheng | 709/204 |
| 2013/0097180 | A1 * | 4/2013 | Tseng | 707/748 |
| 2013/0124437 | A1 * | 5/2013 | Pennacchiotti et al. | 706/12 |
| 2013/0155068 | A1 * | 6/2013 | Bier et al. | 345/440 |
| 2013/0212081 | A1 * | 8/2013 | Shenoy et al. | 707/706 |
| 2013/0254213 | A1 * | 9/2013 | Cheng et al. | 707/748 |
| 2013/0254305 | A1 * | 9/2013 | Cheng et al. | 709/206 |
| 2014/0280936 | A1 * | 9/2014 | Nandagopal et al. | 709/225 |

* cited by examiner

*Primary Examiner* — Dennis Truong
(74) *Attorney, Agent, or Firm* — Nicholson De Vos Webster & Elliott LLP

(57) ABSTRACT

There are provided means for implementing an interface to view and explore socially relevant concepts of an entity graph including, for example, means of a social network system to perform operations including retrieving contextually relevant data for a plurality of concepts within an entity graph of the social network system; retrieving socially relevant data for a user's node within a social graph of the social network system; identifying intersects between the plurality of concepts within the entity graph and the social relevant data for the user's node within the social graph; selecting one of the plurality of concepts within the entity graph based on the intersects identified; and displaying the one of the plurality of concepts within the entity graph at a user interface associated with the user's node.

19 Claims, 8 Drawing Sheets

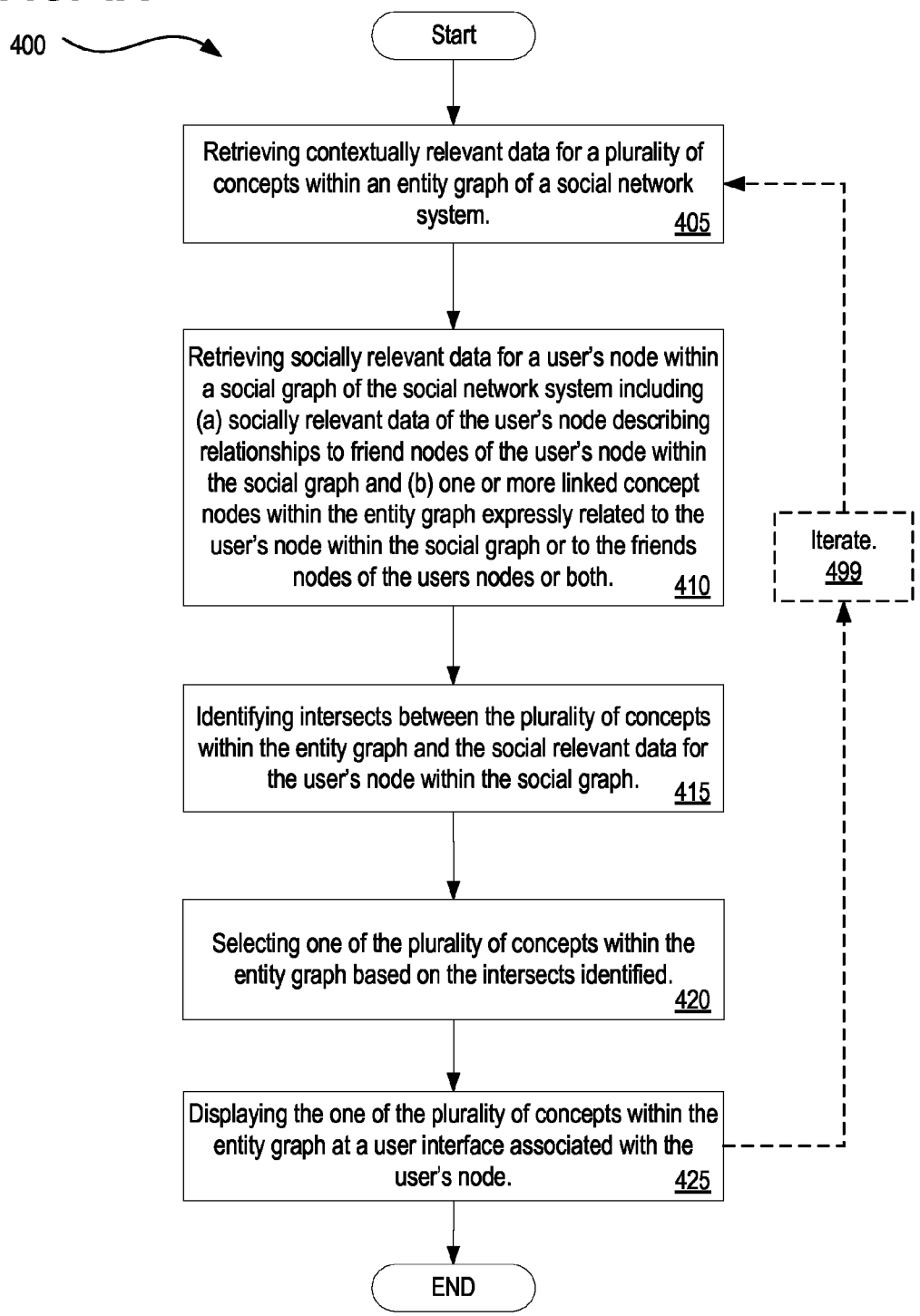

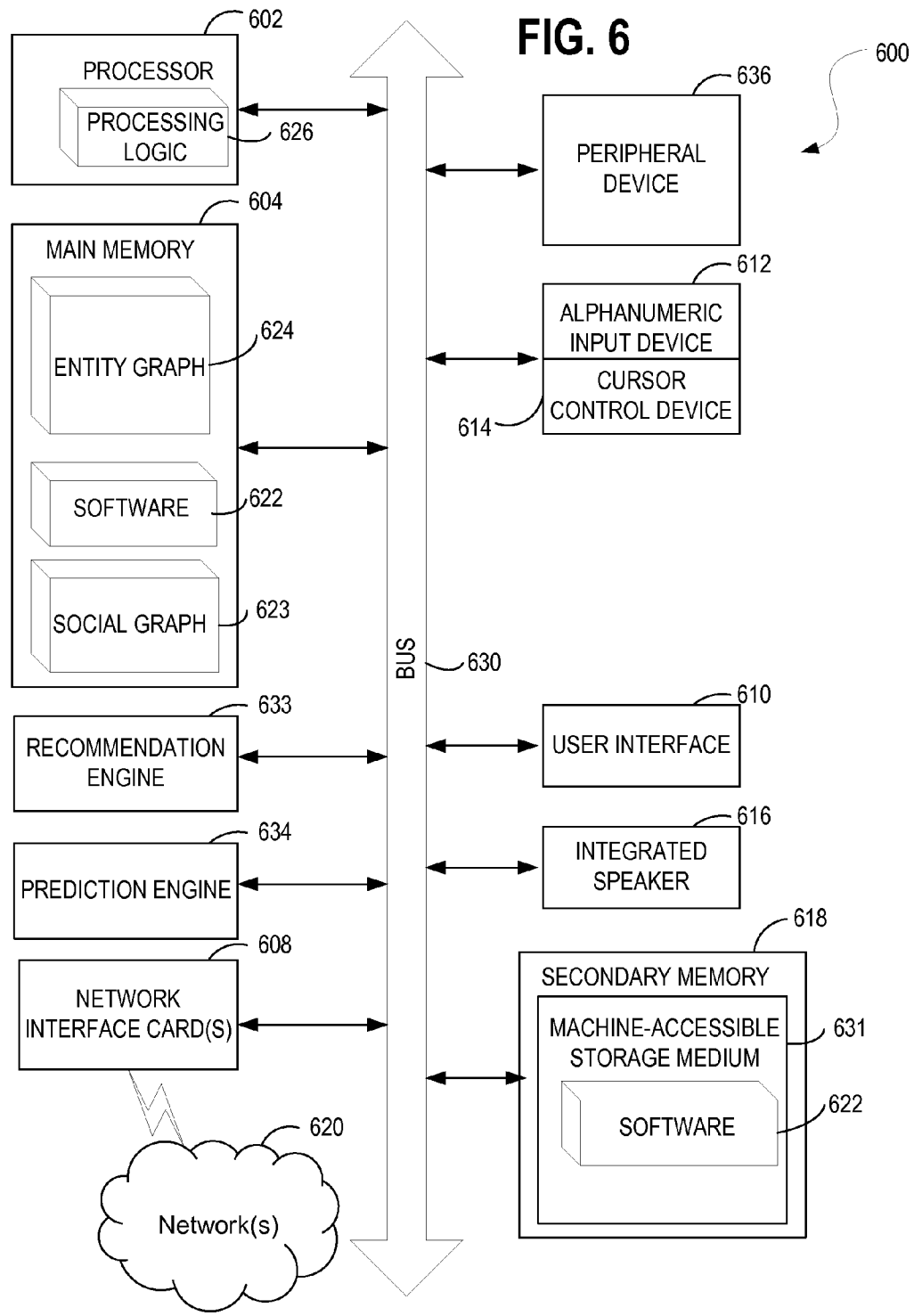

SYSTEMS, METHODS, AND APPARATUSES FOR IMPLEMENTING AN INTERFACE TO VIEW AND EXPLORE SOCIALLY RELEVANT CONCEPTS OF AN ENTITY GRAPH

TECHNICAL FIELD

The subject matter described herein relates generally to the field of computing, and more particularly, to systems, methods, and apparatuses for implementing an interface to view and explore socially relevant concepts of an entity graph.

BACKGROUND

Within the sciences, a "social network" is a theoretical construct used to study relationships between individuals, groups, organizations, etc., in which such individuals, groups, and organizations are described within a social structure according to their respective interactions. Ties through which any given social unit connects represent the convergence of the various social contacts of that unit.

In modern times, social networks are now available to users of the public Internet as vast repositories of data between users of the social networks according to their respective relationships and interests, as well as providing a virtual on-line meeting place for such users of the social networks.

Users of these social networks can populate data about themselves, such as their interests, preferences, and so forth, and further establish express relationships between themselves and other users of the social network. These users, their preferences, interests, and relationships amongst other users within the social network represent what may be called a "social graph" within the social network.

Other data exists within these social networks which make it easier for users to share their interests and preferences in real-world concepts and places, such as their favorite movies, musicians, celebrities, soft drinks, hobbies, sports teams, activities, vacation destinations, cities visited, cities in which the users live, and so forth. This data about real-world concepts, places, and things represent what may be called an "entity graph" within the social network.

BRIEF DESCRIPTION OF THE DRAWINGS

Embodiments are illustrated by way of example, and not by way of limitation, and will be more fully understood with reference to the following detailed description when considered in connection with the figures in which:

FIG. 4A is a flow diagram illustrating a method for systems, methods, and apparatuses for implementing an interface to view and explore socially relevant concepts of an entity graph in accordance with described embodiments;

FIG. 6 illustrates a diagrammatic representation of a machine in the exemplary form of a computer system, in accordance with one embodiment.

DETAILED DESCRIPTION

Figure 1:
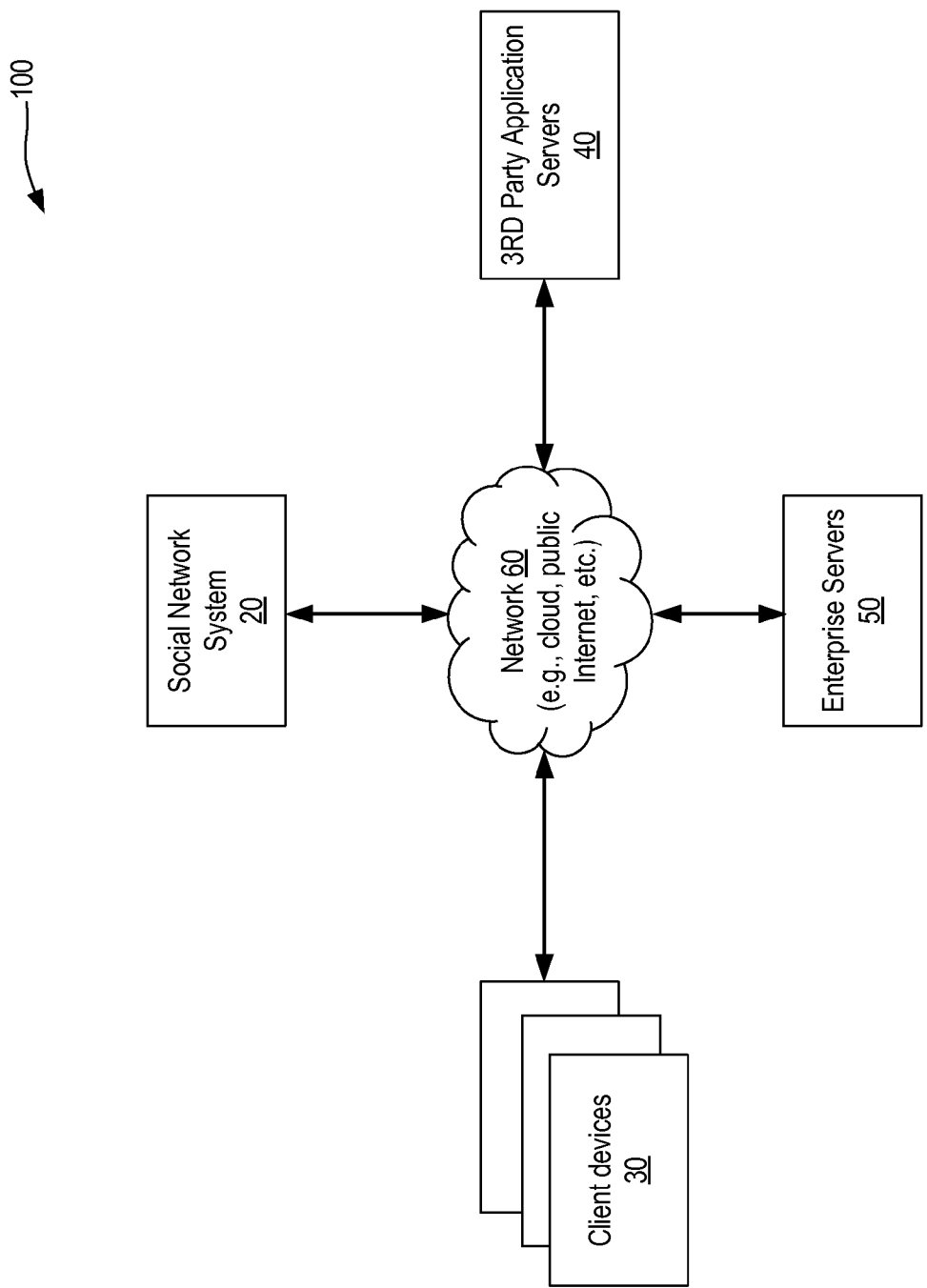
FIG. 1 illustrates an example computer network environment of an example social network environment.

Described herein are systems, apparatuses, and methods for implementing an interface to view and explore socially relevant concepts of an entity graph. The systems, methods, apparatuses, and interfaces which are described herein enable viewing and exploring concepts, such as "San Francisco," etc., using entity graphs. As will be described in further detail below, such pages for concepts are displayed dynamically to users based on contextual relevance to the user's social graph and the entity graph of interest. A search recommendation engine may provide to the user a set of predicted searches, in the form of a dynamic webpage, that are relevant to the particular user in the context of the concept being explored. Unlike the social graph, however, which enjoys well established pages to display information particular to a given user of the social network, for example, the user's "profile" or home page, no such structure or means exists in the conventional arts when it comes to the "entity graph." Display of such information related to real-world concepts, places, and things within the entity graph of the social network is further complicated by the fact that no individual "user" owns or is responsible for a given real-world concept.

The selection of objects to be dynamically displayed may take into account one or more of the following: 1) their relevance to the concept (which can be weighted); 2) number of connections of the objects; 3) friends relationships to the objects, and so forth. Concept pages are also made accessible to search engines, thus allowing a search outside of the social network system to be directed into social network system. In such a way, a concept page may serve as a landing page internal to the social network system from which a known user of the social network system can explore the concept based on deep socially relevant context to that user, or in which an unknown user of the social network system can land on the concept page within the social network system and still explore the concept searched for, potentially yielding revenue opportunities through more targeted and carefully selected advertisements, despite the user being unknown within the context of the social network system authentication and identification capabilities.

The content of the external search query can further be used in the selection of objects to dynamically display, such that other concepts may be presented to the user, and further improving monetization opportunities through more targeted ads and referrals.

Practice of the described techniques for implementing an interface to view and explore socially relevant concepts of an entity graph provide mechanisms by which real-world concepts which are not owned or controlled by users within the social graph may nevertheless be viewed, explored, and further with which relationships may be established between users existing within the social graph and the real-world concepts of the entity graph. For instance, rather than a user listing as part of his profile that he lives in the city of San Francisco, the described methodologies enable such a user of the social graph to form a graph relationship with the entity San Francisco, supplemented by metadata or an attribute indicating that said user "lives" within the city.

Conventional mechanisms for social networks traditionally included lists of text fields for such real-world concepts that users within the social graph may populate, such as the music, movies, and other preferences for a given user, as well as, for example, city of birth, city of residence, and so forth.

However, the present methodologies described herein advocate for replacing such populatable lists for the respective users of the social graph with relationships between the users of the social graph and the real-world concepts, places and things that are liked, preferred, and affiliated with these same users.

Thus, rather than having only the social graph for the respective users, there is a social graph of the users within the social network and also an entity graph of real-world concepts, things, and places, also within the social network system, but which may be linked through relationships between the users within the social graph and the various entities within the entity graph, all within the same social network system.

By adopting such a methodology, it is now possible to transition from a paradigm where all users which like, for example, the band "Smiths," simply indicate as much through a populatable field for "favorite bands," or some other appropriate entry, to a paradigm in which there is no need for a populatable field of favorite bands for the given users of the social graph because the band "Smiths" can exist as a real-world concept within the "entity graph," which is linkable to any given user who so chooses, through an appropriate relationship between a user and the entity of the entity graph corresponding to the band, the "Smiths."

From the user's perspective, there may be little or no difference whatsoever when interacting with the overall social network system through an interface, to effect the act of affiliating with the band, the "Smiths," by so indicating through a populatable field as was done in the past versus by creating a relationship with the band, "the Smiths," indicating the user's affinity for the band. However, the structure of the association within the social network system is quite different, as noted above, and moreover, provides for the opportunity to have distinct entities within the social network system for these real-world concepts, which can then be viewed and explored through the methodologies described herein, whereas with conventional means, there is no realistic mechanism by which many unaffiliated users could, for example, view a page for the "Smiths," simply because a user had indicated a preference for such a band. Instead, a special page would have to have been created for the band, the "Smiths," which would be separate and distinct from any given users' affinity for the band, as the social network system, using conventional means, would lack the necessary association between a user having populated a text box as was done in the past, versus the methodology described herein in which an affirmative relationship is established.

Similar constructs exist as to other real-world concepts. For instance, it is one thing for a user to indicate that they live in the city of San Francisco via a populated text box, and quite another to have that user affirmatively linked to the city of San Francisco through a link or relationship between the social graph and the entity graph of the social network. The latter is much more amenable to application of graph theory principles and therefore is believed to yield greater operational efficiency and also greater exposure to the data of such relationships over conventional mechanisms and constructs.

Another aspect of having an entity graph for entities corresponding to real-world concepts is that the social network system can then allow "friends" of users to also link, through a relationship, to the band, the "Smiths," just as the first exemplary user did, rather than those friends of the user having to go and populate their text populatable boxes indicating an affinity the band, the "Smiths," and in this sense, the user's experience of creating this affinity for the same band as the first exemplary user may be made more efficient and more user friendly.

Further still, because the exemplary entity corresponding to the real-world concept for the band, the "Smiths," exists as an entity within the entity graph, the social network system can systematically seek out additional data, for example, by crawling web sites associated with the band, such as automatically triggering a search for the band, the "Smiths," and then pulling information about the band into the entity for the band within the social network system. For instance, an automatically triggered search may yield a Wikipedia entry for the band, from which data could be dynamically linked or simply read and then populated within the band's entity. For instance, it may be determinable from such a search that the band, the "Smiths," has one or more albums, has a concert tour schedule, has known band members, all of which could then be provided as further detail about the band, the "Smiths," within the entity representation for the band. Modules of the social network system may additionally or alternatively utilize tools such as freebase to crawl available sources and rank information retrieved in according to relevance, confidence, or other criteria.

Another improvement is that because an entity exists for the exemplary band, the "Smiths," it is possible to view that entity within the entity graph, similar to the manner in which user's profiles are viewable within the social graph of users, thus presenting a seamless exploration for users of the social network system, despite the fact that these real-world concepts, places, and things may have no actual owner, as they are not people or users as are the users of the social graph. Thus, the methodologies described herein provide a mechanism by which to view entities of the entity graph in contrast to the limited ability of conventional schemes in which it was only possible to view that a particular user had an affinity for such a real-world concept such as the band, the "Smiths," rather than being able to view that entity directly, agnostic and separate from any given user of the social graph.

Because these entities are now directly viewable, further interactions with them are further enabled which heretofore were not possible when using the conventional methodologies. For instance, because an entity may exist within the entity graph, it is possible for users to interact with that entity by, for example, posting on the "wall," of the entity. Friends who share a common affinity for the same entity, such as the band, the "Smiths," could then, by way of example, be alerted to posts by their own friends who also are linked to the same entity and post on that entities wall, or "check-in" at a physical location corresponding to the entity, or attend an event sponsored by the entity, and so forth. Many more interactive possibilities exist, as well as the ability to trigger contextually relevant updates or refine advertisement selection, based again on relationships with such entities, or based on friends of a user having relationship with such entities, and so forth.

Further enabled by the methodology described is a related pages module which provides for an algorithmic mechanism to collect all of the known structure data for a given entity and organize the structured data into an appropriate page layout in such that it can be easily viewed and consumed by users of the social network system which navigate to the entity's page representation.

Different forms and organizational schemes may exist for the different types of entities which may exist within the entity graph. For example, different formats may be utilized based on the context of such entities, in which a band may have certain types of presentation for its structured data which may be quite different than the presentation of structured data for an entity corresponding to, for example, a city.

The contextual relationships with such entities may also differ such that users may have a first type of contextual relationship with certain entities, such as a band, and yet another type of contextual relationship entirely with, for example, a city, such as San Francisco. For example a user linked to a band may have not only an affinity for the band indicated by the relationship linking the two, but such a user may additionally attend a concert by the band. Conversely, the same user may have a different type of contextual relationship with a city. For example, a user's contextual relationship with a city may be that the user "lives" in the city, or wishes to "vacation" in the city, was "born," in the city, "works," in the city, or in which the user merely "likes," the city, etc. Different contextual relevance types may further be ranked or weighted, for instance, in which a user that "likes" a city as the contextual relevance may enjoy a lower weighting and thus less probability versus the same user who, for example, "lives" in the city, and thus may yield a greater weighting and therefore a greater probability of triggering an alert, or notification, etc., especially when in competition for which one from among many triggering events will be actually displayed or delivered to a given user. In some embodiments, more than one such unsolicited recommendation may be triggered and delivered to the user interface, however, there is a practical limit as to the amount of notifications that may be provided to a single users' interface given the problem of limited screen real estate, especially amongst portable devices such as smart phones and tablets. Again, many more examples exist within the scope of the described methodology for scoring, weighting, notifying, etc., based on the implantation details chosen.

Through these relationships linking users of the social graph with real-world concepts, places and things as entities within the entity graph, it is then possible to trigger alerts, updates, notifications, and other mechanisms which surface contextually appropriate information to users and their friends. For instance, if a user is linked to a city, then when friends of that user post photos affiliated with the same city, those photos may be triggered to be systematically presented to the initial user due to the relationship of the user to the city or due to the user's contextual relationship with the city, depending upon the selection criteria. For instance, photos of San Francisco may be shared via the user's client device at a user's main page, due to the fact that the user (1) is linked to the city and further (2) linked to the other user (e.g., friend) which has triggered a contextually relevant event, such as by posting pictures affiliated with the city which is linked to the first user. These triggers can be made less frequent or more frequent or more probable or less probable based upon filtering criteria or weighting, or other mechanisms to control the amount and periodicity of such updates and notifications, as desired, many of which may further be controllable by the user's themselves via appropriate account settings exposed to such users.

Other possible triggers, by way of example only, may be geographically relevant alerts for friends of a user that are known to be physically present with in a city that is known to be linked to the user. Thus, if user A is affiliated with San Francisco, regardless of the reason, and user B, a friend of user A, travels to the city of San Francisco, then an appropriate alert could be triggered to user A due (1) to user A's relationship with the city (e.g., relationship between the user in the social graph and the entity within the entity graph) and further (2) due to user A's friendship (e.g., social graph relationship) with user B. Many other examples are possible, such as an alert when a users' friend attends a concert of a band linked to the first user, or when a friend of a user check's in at a restaurant linked to the first user, and so forth.

Practice of the described embodiments further improves browsability and exploration for concepts represented by entities within the entity graph. For instance, the social network system may provide social information from users within the social graph and the relationships of social nodes (e.g., users) within the social graph to entity nodes within the entity graph to rank the popularity of a given concept or entity within the social network system, and to further determine how interested any given user may be with a concept available within the entity graph.

Based on these rankings of popularity for the concept and a given user's estimated interest in the same object due to socially available context for that user (e.g., using the user's other known relationships, likes, and other such information), the social network system can provide recommendations for concept exploration within the entity graph, before the user even affirmatively searches for such information. For instance, the system can provide a predictive search and deliver the result as an unsolicited recommendation, and then, if the user clicks on the recommended search, the results will be shown, for instance, by navigating the user to the concepts' representative concept display page within the entity graph, and the user will then further enhance their affinity for that particular concept by virtue of accepting or acting upon the predicted or recommended search. The fact that the user clicks or activates the unsolicited recommendation may be tracked and fed back as input to the prediction engine to improve the confidence for that prediction model.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 illustrates an example computer network environment 100 of an example social network environment. Particular embodiments may operate in, or in conjunction with, a wide area network environment, such as the Internet, including multiple network addressable systems. Network 60 (e.g., cloud, public Internet, etc.) generally represents one or more interconnected networks, over which various systems and hosts described herein may communicate. Network 60 may include packet-based wide area networks (such as the public Internet), private networks, wireless networks, satellite networks, cellular networks, paging networks, and the like. As FIG. 1 illustrates, particular embodiments may operate in conjunction with a network environment 100 having therein a social network system 20 and client devices 30, as well as, in some embodiments, one or more third party web application servers 40 or one or more enterprise servers 50. Client devices 30, third party application servers 40, and enterprise servers 50 may be communicatively interfaced to the network environment 100 and network 60 via a network service provider, a wireless carrier, a set of routers or networking switches, or any other suitable means. Each client device 30, web application server 40, or enterprise server 50 may generally be a computer, computing system, or computing device, etc.

In particular implementations, the client applications allow a user of client device 30 to enter addresses of specific network resources to be retrieved, such as resources hosted by social network system 20, web application servers 40, or enterprise servers 50. These addresses can be Uniform Resource Locators (URLs). Links may be located within the web pages and provide an automated way for the user to enter the URL of another page and to retrieve that page. When a user at a client device 30 desires to view a particular web page hosted by social network system 20, the user's web browser transmits the request to the social network system 20 via the network 60, for example, via the cloud or public Internet.

The request generally includes a URL or other document identifier as well as metadata or other information. By way of example, the request may include information identifying the user, such as a user ID, as well as information identifying or characterizing the web browser or operating system running on the user's client computing device 30. The request may also include location information identifying a geographic location of the user's client device or a logical network location of the user's client device, as well as timestamp identifying when the request was transmitted.

In an example implementation, when a registered user of social network system 20 first requests a web page from social network system 20 in a given user session, the response transmitted to the user's client device 30 from social network system 20 may include a structured document generated by page-generating process for rendering a login page at the client device. The user may then enter his or her user login credentials (e.g., user ID and password), which are then transmitted from the user's client device 30 to social network system 20. Upon successful authentication of the user, social network system 20 may then transmit a response to the user's web browser at the user's client device 30 that includes a structured document generated by page-generating process for rendering a user homepage or user profile page at the user's client device.

Figure 2A:
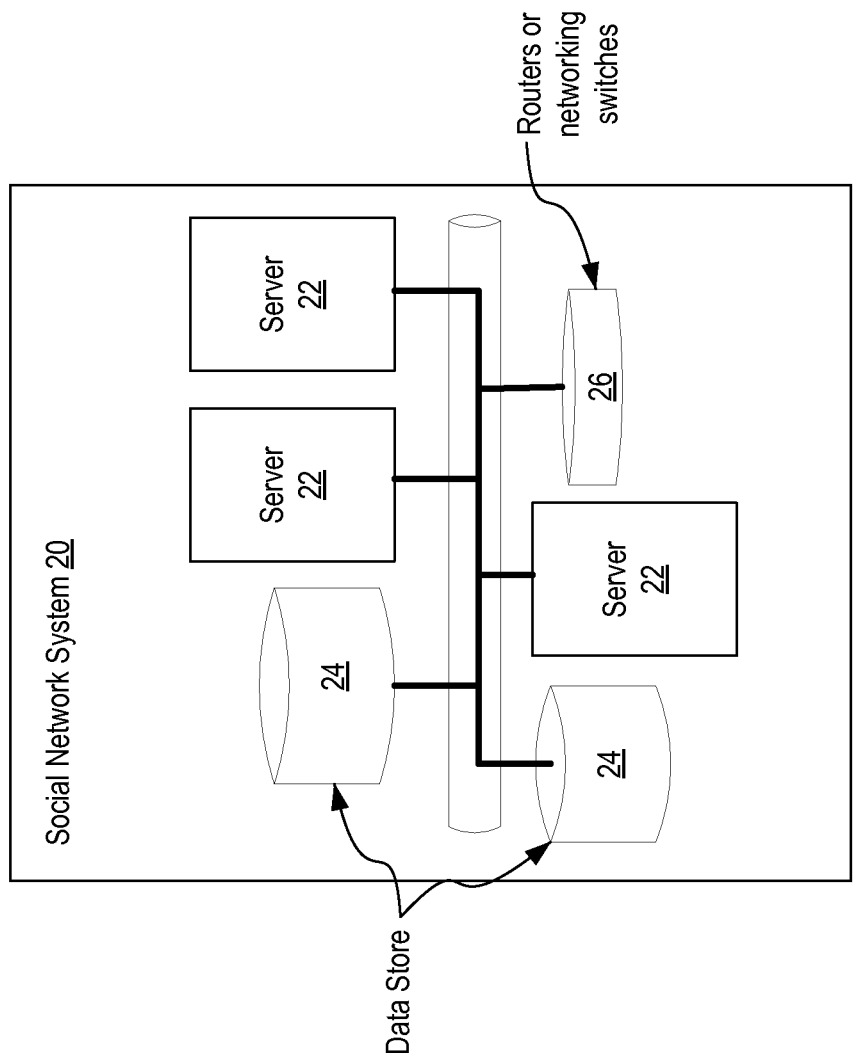
FIG. 2A illustrates example components of an example social network environment.

FIG. 2A illustrates example components of an example social network environment 200. In one example embodiment, social network system 20 comprises computing systems that allow users at client devices 30 to communicate or otherwise interact with each other and access content, such as user profiles, as described herein. Social network system 20 is a network addressable system that, in various example embodiments, comprises one or more physical servers 22 as well as one or more data stores 24. The one or more physical servers 22 are communicably interfaced with network 60 via, by way of example, a set of routers or networking switches 26. The physical servers 22 may host functionality directed to the operations of social network system 20. By way of example, social network system 20 may host a website that allows one or more users, at one or more client devices 30, to view and post information, as well as communicate with one another via the website. Data stores 24 correspond to one or more of a variety of separate or integrated databases, such as relational databases and object-oriented databases that maintain information as an integrated collection of logically related records or files stored on one or more physical systems. Structurally, data stores 24 may generally include one or more of a large class of data storage and management systems. Data store 24 may include data associated with different social network system 20 users, client devices 30, web application servers 40, or enterprise servers 50, as well as, in particular embodiments, data associated with various concepts.

Figure 2B:
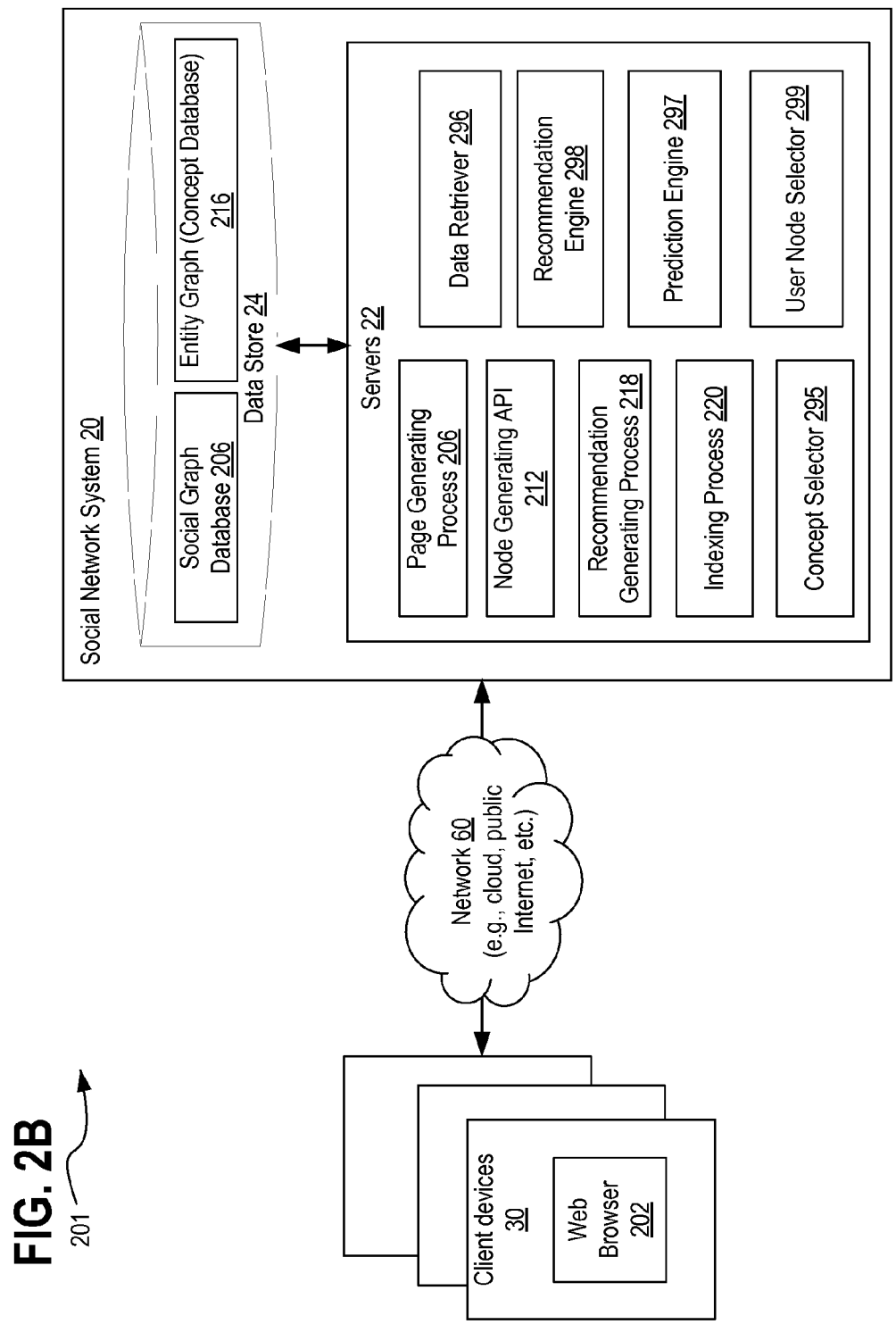
FIG. 2B illustrates an example architecture of the example social network environment of FIG. 2A and an example architecture of an example client device of FIG. 1.

FIG. 2B illustrates an example architecture 201 of the example social network environment of FIG. 2A and an example architecture of an example client device of FIG. 1. Client devices 30 having web browsers 202 therein may connect with the social network system 20 via the network 60 (e.g., the cloud, public Internet, etc.). In the following example embodiments, the social network system 20 may be described or implemented in terms of a social graph including social graph information such as user nodes representing human users of the social network system 20, as well as entity graph representing real-world concepts such as places, things, ideas and concepts, other than the user's which are represented by the user nodes within the social graph. In particular embodiments, data store 24 includes a social graph database 206 in which the social graph information for use in implementing the social network environment described herein is stored. In particular embodiments, the social graph information stored by social network system 20 in data store 24, and particularly in social graph database 206, includes a plurality of nodes and a plurality of edges that define connections between corresponding nodes.

In particular embodiments, the nodes or edges themselves are data objects, such as user objects that include the identifiers, attributes, and information (including the information for their corresponding profile pages) for their corresponding users. The nodes may also include pointers or references to other objects, data structures, or resources for use in rendering content in conjunction with the rendering of the profile pages corresponding to the respective nodes. The data store 24 further includes the entity graph 216, for example, via a concept database, having many concepts therein represented as entities or entity nodes of the entity graph. The entity nodes themselves may also have express relationships between themselves, and the entity objects representing such concepts and entities may themselves include the identifiers, attributes, and information for their corresponding concept page views. In one embodiment, the social network system 20 may query for entity object identifiers for the entity objects representing the plurality of concepts within the entity graph and then query the contextually relevant data from the entity objects using the entity object identifiers, or may similarly query for user object identifiers for the user objects and then query for the socially relevant data for a user's node within the social graph via the user object identifiers.

Within server 22 are page generating process 206 profiles functionality for yielding user node page views or profile views as well as yielding concept page views. Node generating API 212 provides functionality for spawning and managing nodes within the social graph database 206 and the entity graph (concept database) 216 as necessary. Recommendation generating process 218 provides functionality in conjunction with the recommendation engine 298 which yields recommendations to users, sometimes unsolicited recommendations for exploration of the entity graph 216, sometimes monetization opportunities for the social network system 20. Indexing process 220 indexes information within the data store 24 for more efficient retrieval. Concept selector 295 aids the social network system in selecting concepts from within the entity graph which may then be analyzed by the prediction engine 297 to, for example, seek out intersects as well as scoring and ranking the potential concepts for recommendation to users. User node selector identifies the user node being for which the recommendation engine 298 and prediction engine operates to make exploration and monetization recommendations. Data retriever 296 interfaces with the data store 24 and retrieves object and node data as necessary on behalf of the other server elements.

Figure 3:
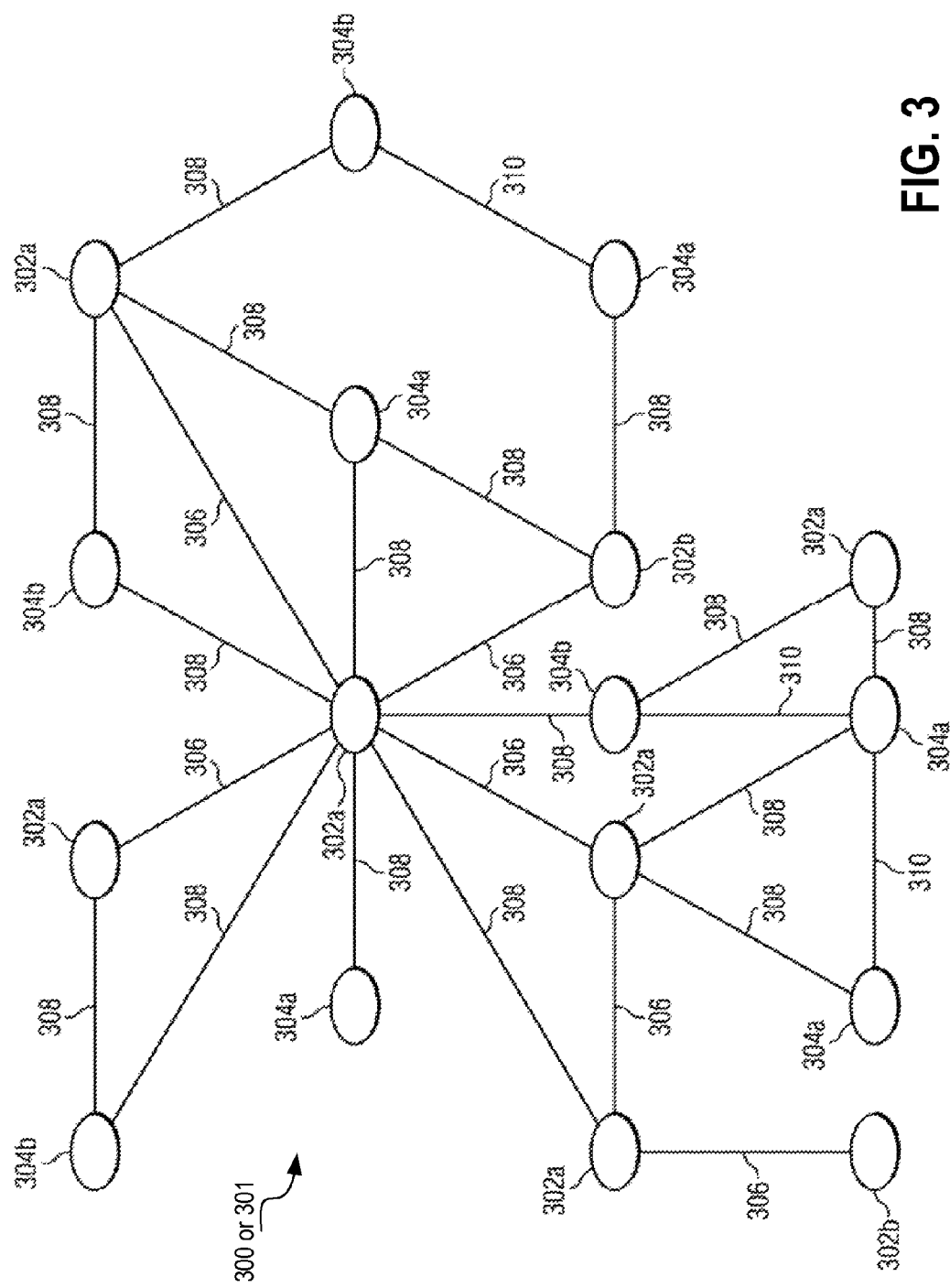
FIG. 3 illustrates an example social graph or alternatively, shows an example entity graph, in which the graph interconnects user nodes of a social graph or alternatively, in which the graph interconnects entity nodes or concepts of an entity graph.

FIG. 3 illustrates an example social graph 300 or alternatively, shows an example entity graph 301, in which the graph interconnects user nodes of a social graph 300 or alternatively, in which the graph interconnects entity nodes or concepts of an entity graph 301, shown here, for didactic purposes, in a two-dimensional visual map representation. In particular embodiments, the plurality of nodes and edges of the respective social graph 300 or entity graph 301 are stored as data objects in data store 24, and particularly social graph database 206 and entity graph (concept database) 216, as described above. Additionally, data store 24 may further include one or more searchable or queryable indexes of nodes or edges generated by indexing social graph database 206 and entity graph (concept database) 216. In particular embodiments, the plurality of nodes includes a first set of administered nodes 302 and a second set of un-administered nodes 304. In particular embodiments, the first set of administered nodes 302 (e.g., 302a and 302b) are user-administered nodes (hereinafter also referred to as "user nodes" or "entity nodes" according to the respective social graph 300 or entity graph 301) that each correspond to a respective user or entity (e.g., concept) and a respective user profile page of that user within the social graph 300 or a respective concept display page of that entity within the entity graph 301. In particular embodiments, user profile pages corresponding to user nodes 304 may be modified, written to, and administered, and entity concept display pages corresponding to entity nodes 304 (e.g., 304a and 304b) may be modified, written to, and administered. User profile pages are generally modifiable by a user having control and ownership thereof, whereas entity concept display pages may have no owner, and are systematically managed as described in accordance with the embodiments herein.

With respect to entity graphs 301 specifically, entity nodes and concepts may be administered, or contributed to, by the community of registered users of social network system 20 through crowd sourcing concepts despite individual users or user nodes of the social graph 300 lacking ownership and express control. In particular embodiments, the second set of entity nodes (e.g., concepts) nodes 304 includes a first subset of un-administered nodes 304a that each correspond to a non-generic entity node (e.g., concept) and a second subset of un-administered nodes 304b that each correspond to a generic entity node (e.g., concept). By way of example, a generic entity node (e.g., concept) may be an entity node (e.g., concept) devoted to an abstract activity such as running while a non-generic entity node (e.g., concept) may be an entity node (e.g., concept) devoted to a more specific concept, such as a profile page devoted to a particular club of runners.

The social network system 20 provides further means or processes, where necessary, for the true voices of entity nodes and concepts corresponding to entity node (e.g., concept) nodes 304 (or un-authenticated user profile pages corresponding to un-authenticated user nodes 302b), such as the actual celebrity or business for which an entity node (e.g., concept) node 304 has previously been created, to claim these nodes thereby assuming administrative rights over them and redefining them in the social graph 300 as appropriate for human users, or within the entity graph 301 as appropriate for administered entity nodes or concepts. As illustrated in FIG. 3, user nodes 302 and entity node (e.g., concept) nodes 304 stored in social graph database 206 or in the entity graph 216 may be connected with one another via edges. As described above, in some embodiments, each edge may be classified or characterized by an edge type of a plurality of edge types that define, indicate, or characterize the connection between the pair of nodes connected by the edge. By way of example, user nodes 302 and entity nodes 302 may be connected with one another via edges 306 of a first edge type. In particular embodiments, edges 306 define friendship or other social relationship connections between users (e.g., friends or friend nodes) associated with the respective user nodes 302 as socially relevant context and edges 306 define contextually relevant context for entity nodes within the entity graph (concept database) 216, such as a district within a city, members of a band, or actors of a movie, and so forth. Additionally, user nodes 302 may be connected with concept nodes 304 via edges 308 of one or more second edge types. By way of example, a user corresponding to a user node 302 may make a declaration or otherwise indicate that he or she likes, is a fan of, wants, or otherwise has an interest in or association with a concept corresponding to a particular entity node (e.g., concept) node 304, and in such a way, a user node with in the social graph establishes a link, express relationship or an edge 306 to a entity node within the entity graph, thus creating an edge 306, link, or express relationship between the respective social graph 300 and entity graph 301. The user may indicate this like or interest via clicking a link on the corresponding concept node's entity node (e.g., concept) or by other suitable means, such as for example, clicking a link in the user's home or profile page in response to an invitation, clicking a link in a friend's profile page, or, in particular embodiments, by some automatic or automated means.

Furthermore, in some embodiments, various entity node (e.g., concept) nodes 304 may be connected with one another in social graph database 206 via edges 310 of a third edge type. This third edge type may define an informational or categorical relationship between entity nodes (e.g., concepts) 304, some of which may tend to organize such entity nodes and concepts into hierarchies. By way of example, a generic entity node (e.g., concept) devoted to Asian food may have a link in the page to various Asian restaurants or review pages displayed in non-generic entity nodes and concepts.

FIG. 4A is a flow diagram illustrating a method for systems, methods, and apparatuses for implementing an interface to view and explore socially relevant concepts of an entity graph 301 in accordance with described embodiments. Method 400 may be performed by processing logic that may include hardware (e.g., circuitry, dedicated logic, programmable logic, microcode, etc.), software (e.g., instructions run on a processing device to perform various operations such as interfacing, querying, retrieving, identifying, selecting, predicting, recommending, displaying, etc., or some combination thereof). In one embodiment, method 400 is performed or coordinated via a social network system, such as that depicted at element 20 of FIG. 1, et seq., or the social network system 501 at FIG. 5. Some of the blocks and/or operations listed below are optional in accordance with certain embodiments. The numbering of the blocks presented is for the sake of clarity and is not intended to prescribe an order of operations in which the various blocks must occur.

Method 400 begins at block 405 with retrieving contextually relevant data for a plurality of concepts within an entity graph of a social network system and at block 410, the method retrieves socially relevant data for a user's node within a social graph of the social network system including (a) socially relevant data of the user's node describing relationships to friend nodes of the user's node within the social graph and (b) one or more linked concept nodes within the entity graph expressly related to the user's node within the social graph or to the friends nodes of the users nodes or both.

The method may be triggered by a user requesting a page view, conducting a search, or otherwise interacting with the social network system. Other times, the method responds to a page load request, for example, from an external search engine, and through the method flow gathers socially relevant information and contextually relevant information pertaining to the search request and dynamically renders a concept page view as the landing page for the search request, such that the search request may be fulfilled, but further, so that users external to the social network system (e.g., at a third party search provider) may be brought into to universe of the social network system to explore the desired searched concept from within the social network system, so as to increase user's exposure to the system through socially and contextually relevant concept (e.g., entity node) exploration, retention within the system, and monetization opportunities by the social network system.

Thus, retrieving contextually relevant information and socially relevant information from the entity graph and the social graph respectively may be responsive to user actions within the system or to events external to the system, but in either case, the method 400 seeks to provide results having deeper contextual and social relevance to the interaction, based on aspects relevant to the potentially arbitrary concept and relevant to the user at hand, and how those data interact, overlap, or intersect, etc.

At block 415, the method identifies intersects between the plurality of concepts within the entity graph and the social relevant data for the user's node within the social graph. For example, the method identifying intersects between the plurality of concepts within the entity graph and the social relevant data for the user's node within the social graph may involve the use of a prediction engine outputs recommendations, and those recommendations are provided to the users' interface as modules which may be activated, for instance, by clicking on them, etc. In one embodiment, such a module for displaying an unsolicited recommendation provides a search reference which can either be executed as is by clicking on a search button, or which may be edited by the user within a text box pre-filled by with the unsolicited recommendation, for instance, as a search query, such that the user can modify the search by adding, changing, or removing some of the search parameters, and then clicking the search button to execute the search, thus allowing for some interactivity between the unsolicited recommendation, the user, and potentially further enticing the user to explore concepts of the entity graph responsive to the unsolicited recommendation. The fact that the user modified the provided search parameter set may also be captured as input for further improving the prediction engine's output.

An example may be for showing a predictive search recommendation to a user books about San Francisco due to the user's contextual relationship with the city of San Francisco and based further on (2) other socially relevant context about the user and/or the user's friends also related to San Francisco and some data about the nature of the book which is being recommended. For instance, it is not desirable to blindly show books related to San Francisco, as such results would likely be large in number and further are likely to be of little interest to the given user without application of more selective criteria to improve the types of books, or the contextual relevance of such books, both to San Francisco which is known to be related to the user in this example, but additionally based on deeper contextual relevance about the user and the user's friends. Therefore, depending on the type of relationship the user has to San Francisco, and based on what the user's Friends are doing in San Francisco, or how they too are related to San Francisco, a sufficiently selective recommendation for the exemplary book could be made to the user, which if acted upon, by the user clicking on the recommendation to explore the book, monetization could be attained, or at the very least, the predictive model could be further validated or prioritized, and the user's nature of contextual relationship with the city of San Francisco may be further enhanced based upon the user selecting the unsolicited recommendation. A non-action by the user may be indicative of a weak predictive model, thus deemphasizing its use within the social network system for that user and other users.

Further still, when seeking contextually relevant information about a user's friends to render a predictive search recommendation, the social network system may assess a how strongly a user's friend is tied or associated with the exemplary city of San Francisco, such that where a user's friend is very strongly tied to the city, that friend's preferences can be used to more strongly weight recommendations to the user pertaining to San Francisco and the aforementioned exemplary book recommendation, and further in which a friend having very weak or tenuous ties to the city can be de-emphasized, such that their weak association to the city does not erroneously or too strongly influence the eventual recommendation or prediction made to the user, for example, as to a book about the city of San Francisco. It is believed that erroneous and irrelevant recommendations owing to failed predictions not only yield inferior monetization opportunities as users will simply ignore the un-interesting recommendations, but furthermore, such erroneously presented recommendations may create noise and annoyance to the user, and be perceived as nuisance advertising, which in turn, may lessen the amount of time the user spends within the social network system, and thus, limits opportunities for further monetization opportunities. Conversely, presenting strongly relevant recommendations to the user which are then acted upon by the user due to the correctness of such unsolicited recommendations, not only presents better monetization opportunities, by may further be perceived by the users of the social networking system as a useful tool for exploration of concepts within the entity graph which may otherwise not have been discovered by that user.

Regarding the predictions made by the social network system to present unsolicited recommendations to the users within the system, such recommendations may be presented at, for example, the users' interface as an icon, or link, or a pre-filled search query, etc., which when acted upon by the user by clicking or activating the recommendation, the user will be navigated to the corresponding landing page for the concept represented by the recommendation, whether that is a book, or a band, a concert, restaurant, etc.

In other instances, the prediction yields socially relevant information for display to the user, rather than a link to a concept page. For instance, where a user has established a link to the concept entity San Francisco, a prediction engine may generate socially relevant information for the user such as, friends A, B, and C of the user "live" in San Francisco, or are physically presently located in San Francisco, etc. If the user read a book by Mark Twain, then the prediction engine may yield information about Mark Twain's relationship to San Francisco, thus combining two disparate but contextually relevant aspects as to that single user, or of the user's friends, into a search result, such as places within San Francisco visited by Mark Twain or affiliated with Mark Twain, etc. The clickable result may then provide a link to a concept page for Mark Twain within the entity graph for the sake of concept exploration within the entity graph, or perhaps several clickable options pertinent to the predictive search result, such as links to Mark Twain's concept page in addition to links to, for example, the Golden Gate Bridge within the city of San Francisco because it was visited by Mark Twain, or quotes by Mark Twain relevant to San Francisco, and so forth, again, not necessarily for the sake of immediate monetizing opportunities, but rather to aid the user in exploration of concepts pages available for viewing within the entity graph of the social network system. These examples are a select few of several from a vast universe of possibilities made accessible by providing the entity graph with its concept based entities therein within the social network system thus completing the traditional social graph paradigm for user nodes.

The predictive exploration results may also be weighted so as to emphasize or deemphasize various possible results. For instance, because a user is linked to an exemplary San Francisco concept within the entity graph, it may be further determinable based on that user's social relevance within the social graph that the user is further linked with, for example, the Mission District neighborhood, which is near the Golden Gate bridge and thus contextually relevant to some extent, and through this only, further contextually relevant with Mark Twain. Distinct from the preceding example, where Mark Twain was relevant due to the user's having read a book by Mark Twain and indicating as such, here the contextual relevance to Mark Twain is highly tenuous, having taking multiple hops deep into the entity graph to arrive at the particular contextual link from the user's node within the social graph through the multiple concepts of the entity graph. Thus, while the same contextual relevance exists as in the preceding example, the prediction engine may deemphasize these more distant contextually relevant links, thus making them inferior to other potential results, and therefore less likely to prevail as the ultimate recommendation provided to the user, assuming multiple competing recommendations exist. Stated differently, for any given user, more tightly affiliated contextually relevant concepts within the entity graph may be emphasized over more distant concepts, such that closer concepts to the user based on the user's own social relevance are more likely to be provided by the prediction engine. In such a way, the exploration mechanism will provide recommendations having some overlap with the user's known interests, and thus, while perhaps a new and yet to be explored concept for that given user, the recommendations will nevertheless enjoy a greater likelihood of being activated by the user due to a greater overlap with the user's interest or social relevance than perhaps a more arbitrary recommendation which fails to account for how strongly or closely the user can be tied to the predictive result.

At block 420, the method selects one of the plurality of concepts within the entity graph based on the intersects identified. For example, the method selecting which of the plurality of available concepts for display may be implemented via a recommendation engine operating in conjunction with the prediction engine. For example, the method may consider criteria by which to assess a user's closeness to a concept for exploration may include, for example the total number of the user's friends that are in the Mission District of San Francisco, from the preceding example, photo's by friends or by the user which are taken at, for example, the Golden Gate bridge, friends who work or have checked in at the Golden Gate bridge, and so forth. These types of criteria may be referred to as "soft connections." That is, the user in question may not be directly related to the Golden Gate bridge's concept entity within the entity graph, but can be "connected" to the entity nevertheless through the user's own activities and interests and the user's friends' activities and interests, through analysis of the user's social relevance within the social graph and further through that user's social relevance to the various entities within the entity graph, even when not directly connected via an edge, link, or express relationship between the user's node within the social graph and the entity at issue within the entity graph.

According to one embodiment of the ranking algorithm, all contextually relevant information that can be identified is identified as a sub-set for the prediction, elements of the subset are weighted so as to emphasize or deemphasize their use by the prediction engine, and then a best prediction is made which may then be presented to a user of the social network system as an unsolicited recommendation, which may be for the purpose of aiding the user with exploring yet to be discovered concepts within the entity graph or may be for the purpose of linking the user to a concept within the entity graph tied to a monetization opportunity, such as the sale of a product, such as a book, or the sale of a service, such as event tickets, etc. Ranking may utilize recency considerations in certain embodiments, or TF-IDF (Term Frequency-Inverse Document Frequency) mechanisms in yet other embodiments. TF-IDF is a numerical statistic which reflects how important a word is to a document in a collection of known elements and is useful for application of a weighting factor for information retrieval and data mining. Application of TF-IDF yields a value which increases proportionally to the number of times a word appears in the document, but is offset by the frequency of the word in the collection, such as the sub-set of data contextually relevant to the query at hand in the preceding example, in which the offset by frequency mitigates the fact that some words are generally more common than others.

Thus, in one example, the prediction engine may traverse two degrees of relation to find relevant objects of relevant objects, that is to say, concepts, places, or things contextually relevant to a user's "friends," or friend nodes, representing those concepts within the entity graph which, though not related to the user, may be of interest to the friends of the user, and therefore are thought to be more likely of interest to the user also, therefore enabling exploration and monetization opportunities, as well as aiding to keep the user more fully immersed within the social network system as a whole by driving up interactivity between the user and the system and by further providing exploration recommendations which are socially relevant to the user.

Such contextual relevance of a user's friends in one embodiment may be specific to genres of digital content. For instance, the prediction engine may seek to correlate books, music, movies, and other content known to be contextually relevant to the user's friends to enumerated genres for such content, from which degrees of relation to that content may then be identified and used as potential hits representing exploration opportunities for concepts within the entity graph to be recommended to the user. For instance, if a user's friends like certain types of music, as evidenced by the friends' affinity for certain bands, songs, albums, genres, etc., then the prediction engine may exploit this fact on the assumption that the user may also be interested in the same types of music genres as those of the user's friends. The greater the links between users of the system, for example as defined by quantity and types of interactions, may additionally be utilized to increase the weightings for potential hits of one closely linked friend of a user over potential hits from a more tenuously linked friend of the same user. Other criteria are feasible as well within the context of this prediction, ranking, and weighting methodology.

All of these weightings, rankings, and evaluations are then provided as inputs to the prediction engine or computed, processed, and calculated by the prediction engine itself, which works cooperatively with a recommendation engine to identify which concept among potential a great many concepts will be surfaced and thus recommended to the user as an unsolicited recommendation. For instance, the unsolicited recommendation to be presented to the user at the user's interface of a client device, within a notification space on a mobile, smart phone, or tablet application communicatively interfaced to the social network system, etc., with the goal of inducing the user to activate the unsolicited recommendation as an exploration opportunity and/or a monetization opportunity.

According to embodiments described herein, there may be relationships between concept entities within the entity graph, and metapages may be utilized to connect known similar or related concept pages representing entities within the entity graph. For instance, there may be a Macy's page representing an entity within the entity graph, but other concepts also related to Macy's may also exist within the entity graph, and these distinct but related entity pages for the respective concepts may be associated, linked, or related though the use of metapages.

Further still, the metadata within the metapages and metadata within the respective concepts' entity pages themselves is editable according to certain embodiments, in much the same way that public users on the Internet may edit Wikipedia entries, yet not necessarily own or control those entries. Such a model allows users who, for whatever reason view the respective concept pages for entities within the entity graph, to edit and add information, thus allowing a crowd sourcing model in addition to a systematic crawling and data retrieval model. Thus, users can land on the exemplary San Francisco city concept page and add information and additional content to the concept page view. Further still, data which is retrieved systematically by the social network system may have a weak confidence level, owing to, for example, an uncertain source, poor structuring of the retrieved data, or other reasons, and the concept pages for respective entities being populated may display the poor confidence information to users having a known contextually relevant link to the concept (e.g., a user that lives or works in San Francisco, for example), along with a request to the presumably knowledgeable user to verify the information, thus increasing the confidence for the information, and its usefulness and appropriateness for inclusion with the concept at issue.

At block 425, the method displays the one of the plurality of concepts within the entity graph at a user interface associated with the user's node. The method's display operation may operate differently depending on the goal or the type of result desired to be achieved. For instance, sometimes, the method may seek to send exploration opportunities to a user in an unsolicited manner. Sometimes the method may seek to send monetization opportunities to the user, also in an unsolicited manner. Other times, the method may seek to solicit the aid of a user experienced with a given concept to confirm or refute the veracity of data within the social network system which has been retrieved but which lacks sufficient confidence for global display to all users, and thus, an experienced user is selected to view the information and prompted to confirm or refute the correctness of the information.

In certain embodiments, information may be restricted from inclusion with a concept and thus restricted from global display to all users due to insufficient confidence in the data. In such embodiments, the data may be selectively presented to only users evaluated to have a strong association to the existing concept, and the prediction engine may purposefully overweight the concept such that the concept is presented to a user with a strong relationship in an effort to selectively display the low confidence data to a knowledgeable user for the sake of validation or repudiation. In certain embodiments, validation of low confidence data occurs after querying a certain quantity of users successfully. In other embodiments, validation of low confidence information occurs after attaining a higher confidence scoring over a threshold requirement, in which each user queried is contributes to the validation score for the low confidence information based upon the users' expertise for a given concept, as assessed according to the users' contextual relevance to the concept in question. Thus, a user who lives in San Francisco or works in San Francisco may be evaluated as an expert and thus, their affirmative confirmation of an information's veracity may contribute more to a validation score than would a user's affirmative confirmation who's contextual relevance to the city of San Francisco is limited to merely "liking" the city or wanting to "vacation" in the city and which may therefore be evaluated as less than an expert according to preferred relationship types for the given entity type.

In other embodiments, users with weaker expertise as assessed for a given concept will be wholly prohibited from seeing the low confidence information or being queried as to the veracity of the low confidence information, until such time that the information is adequately verified and made available for global display to all users. In such a way, the social network system can systematically collect information from external to the system, and then "scrub," verify, or authenticate the appropriateness of the potential information by querying those users deemed to be sufficiently knowledgeable about the related concept within the entity graph. Working in conjunction with a prediction engine facilitating "exploration," the knowledgeable users can be enticed to explore these concepts of which they are already knowledgeable, by causing the prediction engine to output these concepts requiring information validation from knowledgeable users by appropriately weighting the concepts during the prediction according to the user's assessed knowledge of the concept, rather than seeking out yet to be explored but potentially relevant concepts, as was described in the prior examples.

In certain embodiments, entity pages for concepts within the entity graph are wholly un-owned by any party or entity, and non-owners viewing the pages can initiate or request a page review by clicking on an appropriate icon which then sends a request to either administrators of the social network system to review the page or which then alters the weightings utilized by the prediction engine, such that the concept page is again subjected to further information validation by deemed knowledgeable users for the concept, as was described in the prior example. For instance, if sufficient users trigger the request for page review, then the confidence in the information for that concepts' entity page may simply be lowered below the necessary threshold for global display, or a count of required affirmative verifications for the data on the concept page can be increased, for example, from zero for an already verified concept page or data of the concept page, such that the prediction engine will begin soliciting affirmative confirmation for the concept page and the page's data. In such a way, the appropriateness of information displayed on an un-owned page can be kept to a heightened quality standard, and as the correctness or appropriateness of information displayed changes over time due to real-world events, the social network system can systematically improve the data through the cycle of displaying such entity pages to users who may of their own accord, request or initiate requests for page review of the un-owned concept pages corresponding to entities within the entity graph.

In other embodiments where concept pages are owned or controlled by a particular entity, for instance, the band, the "Smiths," takes control of their own entity page, then a user who requests a page review may initiate the social network system to communicate a link to the concept page's owner or controlling entity, as they would likely be the best and most knowledgeable about information provided by their respective concept page within the entity graph. In either case, the quality of the information within concept pages for entities of the entity graph may be systematically and continually improved upon through the interactivity with users and the crowd-sourcing model, rather than always requiring an administrator of the social network system to manually review such data pursuant to page review initiations.

Concept pages may further be dynamically generated and then made available to landing pages or search result pages from external search engines, such that known users of the social network system and unknown users of the social network system may be brought into the system pursuant to a search and click result at a third party search facility. For instance, searching at Google, Bing, or Yahoo! for the band, the "Smiths," would preferably cause those search engines to display a link to the concept page for the band, the "Smiths," within the entity graph of the social network system as a top search result due to the presence of the page being accessible to the public Internet and due further to the richness and quality of the information or metadata about the band, the "Smiths," within the concept page for the band, regardless of whether it is an owned and controlled concept page or wholly un-owned and not controlled by any entity, other than by the systematic information verification mechanism of the social network system itself, as described previously.

Thus, according to embodiments involving an external search engine, content may be made available within those search results at the external search engines for the concept's page view, such as public posts and public photos of that respective concept's entity. If a user of the external search engine clicks the search result at the external search engine corresponding to the entity, then the user will be navigated into the social network system and land directly at the entity's concept page view, regardless of whether the user is known and authenticated, or not, within the context of the social network system.

Because the search result is a concept page view of an entity within the entity graph, what will be displayed is a page module, within which various elements may be displayed to the user having landed at the search page, such as public posts, public photos, and known good/verified metadata, such as places within San Francisco, events within San Francisco, etc. In certain embodiments, a geographic approximation of the user searching is made in relation to the concept being searched and then landed upon if a corresponding search result is clicked at the external search engine, thus enabling for specialized monetization opportunities, such as plane tickets to or from, for example, a city, or concert tickets or hotels within a city, etc. Other examples are feasible, for instance, if the entity corresponds to a book about San Francisco, then book stores within San Francisco could be displayed dynamically to the user, again, presenting monetization opportunities through contextually relevant results.

If the user is known, the socially relevant results may further be displayed at a landing page from an external search engine, just as is described above, for instance, by displaying information at the landing page for the concept which includes socially relevant information about the known user's friends, as they pertain to the search that brought the user from the external search engine to the concept landing page within the social network system. For instance, a search for Lady Gaga and San Francisco at an external search engine which yields a search result for a concept page within the social network system may display to a known user, not just information about Lady Gaga's contextual relevance to San Francisco, such as a tour date, etc., but additionally posts, likes, or ticket purchases by the users' friends, thus presenting both contextually relevant data and socially relevant data to the specific user, when the opportunity arises, by integrating user-specific content onto the display of the entities concept page display.

In certain embodiments, external search results are assessed for coming from a mobile device, such as a smart phone or a tablet, etc., and geographic information is specifically referenced to provide socially relevant information about the user in the context of the geographic location of the user and the user's friends. For instance, proximity to friends of the users may be assessed such that the user may be alerted to friends that are near that geographic location, within the landing page for a concept arrived upon from an external search engine.

After block 425, the method may either simply end, or may iterate through block 499, as necessary, by returning to the start and beginning again at block 405.

Figure 4B:
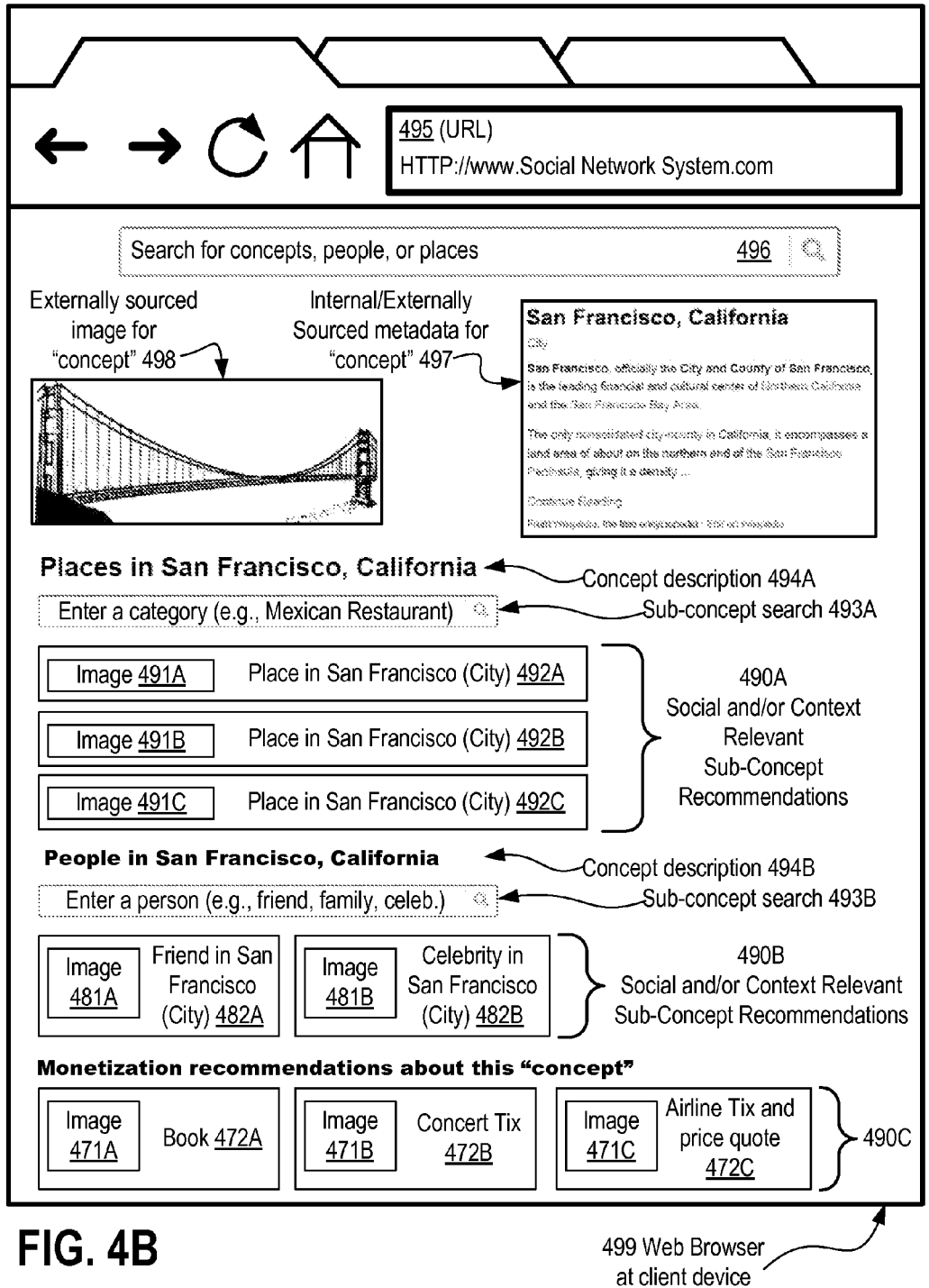
FIG. 4B is an exemplary web browser user interface at a client device having socially and contextually relevant recommendations displayed according to described embodiments.

FIG. 4B is an exemplary web browser 499 user interface at a client device having socially and contextually relevant recommendations displayed according to described embodiments. For instance, the web browser 499 user interface at a client device may receive, from the social network system, unsolicited recommendations as well as a variety of other display elements, such as socially and/or contextually relevant sub-concept recommendations at element 490A, socially and/or contextually relevant sub-concept recommendations at element 490B, and a variety of monetization opportunities at element 490C.

In this particular embodiment, the concept page view is displayed within the web browser 499. However, many of the various display elements 490A, 490B, 490C, etc., may be displayed to a user's interface in other instances, such as within a user's profile display page (e.g., a home page or primary page within the social network system). For instance, when at a user's profile page, the social network system may send unsolicited recommendations for display at the user's interface, such as sending the people in San Francisco, Calif. at concept description 494B and the related socially and/or contextually relevant sub-concept recommendations at element 490B showing a friend in San Francisco at element 482 and the celebrity in San Francisco at element 484B.

At the top of the web browser 499 user interface, it can be seen that the URL 495 is directed toward the front end serving web interface of the social network system (e.g., via the fictitious HTTP://www.Social Network System.com web address).

On this particular concept page display view, there is a concept search box 496, into which a user can type any concept, such as the proposed "Search for concepts, people, or places. Searching for a "concept," at this search box 496 will bring up a corresponding concept page view for that concept searched based on the information associated with such a concept of the entity graph.

On this particular concept page view for San Francisco, there is an externally sourced image (a depiction of the Golden Gate Bridge) for the concept at element 498, which is contextually relevant to the "concept" of San Francisco according to metadata of the entity object corresponding to the entity or concept as stored within the entity graph. The image at 498 could alternatively or additionally be socially relevant, for instance, displaying a picture somehow related to the user associated with the user device where the web browser 499 is displaying the information. For instance, a photograph geo-tagged at the golden gate bridge with a picture of the user's friend, "Joe," tagged and associated with Joe, or perhaps uploaded by Joe himself, would be both contextually relevant (e.g., it is geographically related to the city of San Francisco) as well as socially relevant to the concept of San Francisco as to the user here, that is, Joe is the user's friend, information which is socially relevant to this user, but may be wholly irrelevant as the vast many other users within the social network system.

At element 497, there is displayed internally or externally sourced metadata for the concept. The information actually shown by this embodiment is linked information from Wikipedia for the San Francisco concept page view, however, information may also be retrieved and stored internally as metadata associated with the entity/concept San Francisco in the entity graph. This information may also be subjected to confidence thresholds, and displayed selectively based on characteristics of a given user, as described previously.

Further down the concept page view within web browser 499 is a concept description at 494A indicating "Places in San Francisco, Calif.," which is of a "city" type concept. Depending on the type of the concept or entity, different layouts may apply. For instance, a band concept page display view may show albums, members, tour schedules, and other such data, none of which is relevant as to a "city" type concept page view.

A sub-concept search box 493A is further provided, suggesting to the user to search for sub-concepts within the displayed category view, stating: "Enter a category (e.g., Mexican Restaurant)," which will then yield information contextually relevant to the concept of "San Francisco" the city with results that fulfill the search parameter, such as Mexican Restaurants, being contextually limited to those within the city of San Francisco despite the lack of further narrowing parameters entered by the user.

Below the concept description 494A and the sub-concept search 493A are unsolicited recommendations from the recommendation engine of the social network system displayed at the user's interface. Specifically shown at element 490A are socially and/or contextually relevant sub-concept recommendations. For instance, shown here at element 490A are three places in San Francisco, 492A, 492B, and 492C, each having a contextually relevant or socially relevant image 491A, 491B, and 491C corresponding thereto. For instance, place 492A may depict Fisherman's Wharf which is a place within the city of San Francisco and is contextually relevant to the concept or entity of San Francisco. Place 492B may depict China Town, for the reasons that the prediction engine surfaced socially relevant information that a friend of this user is within the city of San Francisco, and specifically within China Town, and thus, the recommendation engine may present this to the user with an indication of the friend's presence there, thus being both socially relevant to the user and contextually relevant to the concept. The intersect of the friend and the place is representative of the type of intersects that can be found which may vary wildly based upon the varying nature of the individual human users represented by user nodes within the social graph of the social network system and the vast array of possible concept or entities represented by entity nodes within the entity graph of the social network system.

More examples are provided further below, where concept description 494B indicates "People in San Francisco, Calif.," and sub-concept search 493B presents an opportunity for the user to search for or explore sub-concepts of the "People" within the primary concept page view of "San Francisco," in which the sub-concept search 493B prompts: "Enter a person (e.g., friend, family, celebrity)." Unsolicited recommendations are then shown at element 490B depicting socially and/or contextually relevant sub-concept recommendations, in which there are two shown here, a friend in San Francisco at element 482A and a celebrity in San Francisco at element 482B, each also associated with a socially and/or contextually relevant image at elements 481A and 481B respectively. For instance, the friend at 482A displays an expressly linked friend within or related in some way to the city of San Francisco. For instance, Joe from the preceding example is known to be in San Francisco. Alternatively, the prediction engine may surface the fact that the user's friend "Jill" was born in San Francisco, and thus, the recommendation engine selected this data for presentment to the user, which is both socially relevant to the user and also contextually relevant to the concept of San Francisco. The second person is a celebrity in San Francisco or related in some way to San Francisco at element 482. For instance, in preceding examples, we noted that Mark Twain visited the city of San Francisco, so he would be a potentially contextually relevant recommendation to be found, identified, and recommended for presentment. Alternatively, Lady Gaga may be touring in San Francisco, and this information could be selected for presentment as contextually relevant and more over, potentially socially relevant, for example, if the user indicates an affinity to Lady Gaga, such as by a "Like" at an object affiliated with Lady Gaga or even an edge, link, or express relationship between the user's node in the social graph and the entity node for the concept of Lady Gaga within the entity graph.

Near the bottom of the concept page view for San Francisco in this embodiment are monetization recommendations 490C presented to the user's interface, for instance, by depicting a book 472A and a corresponding image 471A, each of which may be contextually and/or socially relevant to the user, for instance, a book about some aspect or involving San Francisco, and thus contextually relevant, and perhaps involving a topic of interest of this user or of the user's friends, and thus socially relevant also. This would be a monetization opportunity because clicking on the book generates ad revenue, for instance, by presenting the user with a local bookstore near the user where the book may be purchased, assuming the user is actually in San Francisco, or by presenting a link to an online book store for purchase, should the user not be in San Francisco. In a similar fashion, concert tickets 472B are presented as a monetization opportunity with image 471B, for instance, presenting the user with an unsolicited recommendation to purchase tickets to a San Francisco Bay tour from the nearby pier (not a concert, but a ticketing event opportunity nonetheless) or alternatively to purchase concert tickets for Lady Gaga with whom the exemplary user has an affinity and whom further may be touring to San Francisco, thus being both socially and contextually relevant to this user and the concept of San Francisco. Lastly, the airline tickets and price quote 472C are presented as an unsolicited monetization recommendation to the user with corresponding image 471C, and may, by way of example, link the user to a travel website where tickets may be purchased either to San Francisco from the city in which the user is presently located, or if the user is in San Francisco already, then to another city that is socially relevant to the user, for instance, to visit the user's parents known to live in New York City according to meta data of the user's node within the social graph or via the user's parents being a "friend" and thus a linked secondary user node within the social graph. Regardless, the presentment of the unsolicited recommendation is based on the intersects between information retrieved according to the user's node within the social graph and the concept within the entity graph, and those intersects being evaluated, ranked, ranked, for strength or other considerations for this particular user and this particular concept.

Figure 5:
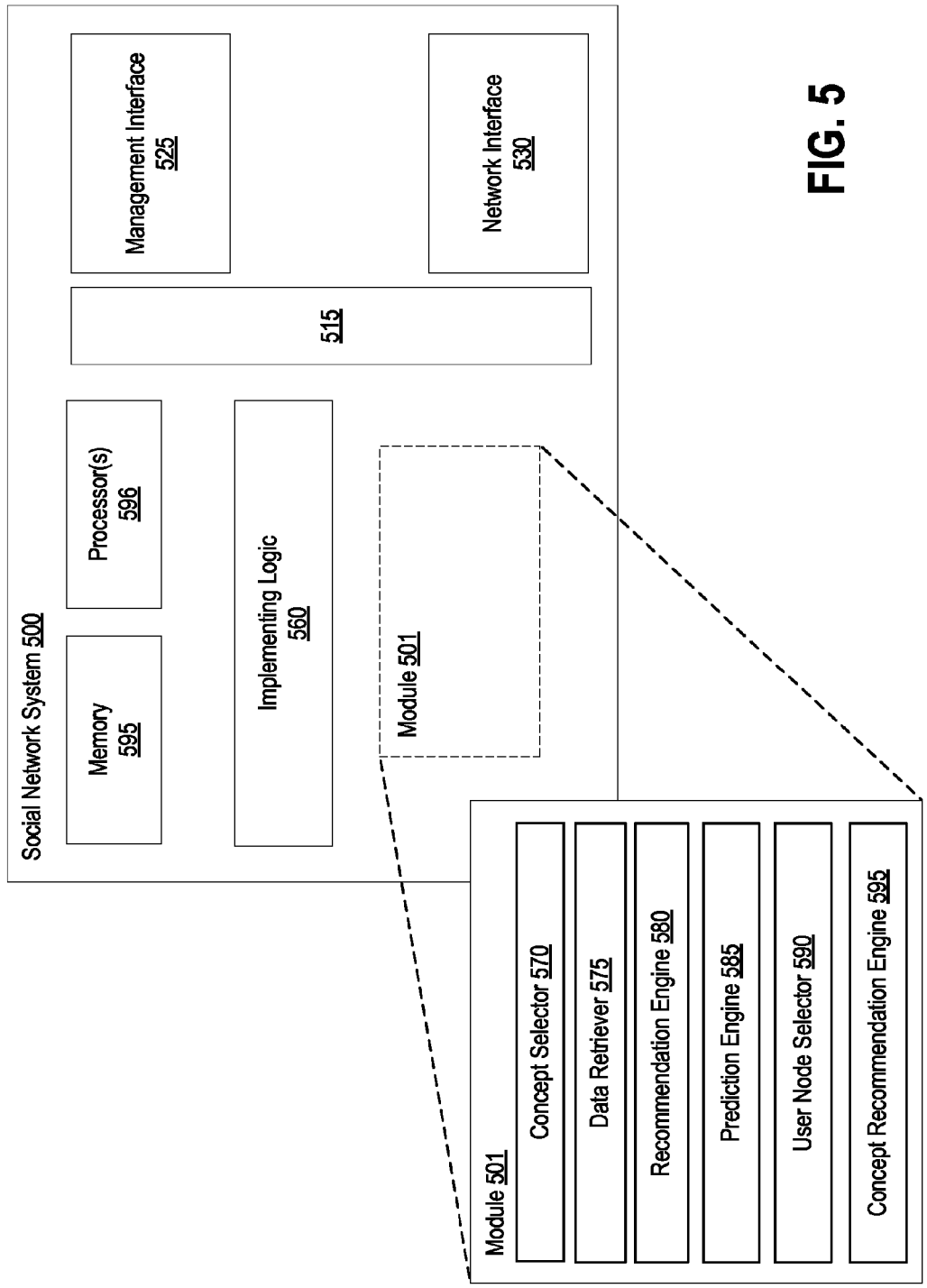
FIG. 5 shows a diagrammatic representation of a social network system having a module optionally configured therein in accordance with which embodiments may operate.

FIG. 5 shows a diagrammatic representation of a social network system 500 having module 501 optionally configured therein in accordance with which embodiments may operate.

In one embodiment, system 500 includes a memory 595 and a processor or processors 596. For example, memory 595 may store instructions to be executed and processor(s) 596 may execute such instructions. Processor(s) 596 may also implement or execute implementing logic 560 having logic to implement the methodologies discussed herein. System 500 includes communication bus(es) 515 to transfer transactions, instructions, requests, and data within system 500 among a plurality of peripheral devices communicably interfaced with one or more communication buses 515. In one embodiment, system 500 includes management interface 525, for example, to retrieve information, receive requests, return responses, and otherwise interface with client devices, third party servers, enterprise servers, and other elements located separately from system 500.

System 500 further includes network interface 530 to communicate information via a network, such as the cloud or the public Internet, etc., as communicatively interfaced with the social network system 500.

Distinct within system 500 is module 501 which includes Concept Selector 570, Data Retriever 575, Recommendation Engine 580, Prediction Engine 585, User Node Selector 590, and Concept Recommendation Engine 595. Module 501 may be installed and configured in a compatible system 500 as is depicted by FIG. 5, or provided separately so as to operate in conjunction with appropriate implementing logic 560 or other software. Module 501 may be located in any of the previously described embodiments of social network system at element 20 of FIGS. 1-3, as previously described.

Thus, it is in accordance with one embodiment that a system 500 having a processor 596 and memory 595 therein includes a concept selector 570 to retrieve contextually relevant data for a plurality of concepts within an entity graph of the social network system; a user node selector 590 to retrieve socially relevant data for a user's node within a social graph of the social network system including (a) socially relevant data of the user's node describing relationships to friend nodes of the user's node within the social graph and (b) one or more linked concept nodes within the entity graph expressly related to the user's node within the social graph or to the friends nodes of the users nodes or both; a prediction engine 585 to identify intersects between the plurality of concepts within the entity graph and the social relevant data for the user's node within the social graph; in which the prediction engine 585 is to further select one of the plurality of concepts within the entity graph based on the intersects identified; and a concept recommendation engine 595 to transmit for display, the one of the plurality of concepts within the entity graph, to a user interface at a client device associated with the user's node communicatively interfaced to the social network system 500.

FIG. 6 illustrates a diagrammatic representation of a machine 600 in the exemplary form of a computer system, in accordance with one embodiment, within which a set of instructions, for causing the machine/computer system 600 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618, which communicate with each other via a bus 630. Main memory 604 and its sub-elements (e.g. 622, 623 and 624) are operable in conjunction with processing logic 626 and processor 602 to perform the methodologies discussed herein.

For example, main memory 604 includes entity graph (e.g., concept database) 624 having therein entity objects representing entity nodes; social graph 623 having therein user objects representing user nodes; and software 622.

Prediction engine 634 implements the various methodologies described above, such as analyzing, weighting, scoring available concepts under consideration to make an appropriate prediction output for recommendation to a user and recommendation engine 633 selects the appropriate recommendation based on the output of the prediction engine 634.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.).

The secondary memory 618 may include a non-transitory machine-readable or computer readable storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-readable storage media. The software 622 may further be transmitted or received over a network 620 via the network interface card 608.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
    retrieving contextually relevant data for a plurality of concepts within an entity graph of the social network system;
    retrieving socially relevant data for a user's node within a social graph of the social network system including (a) socially relevant data of the user's node describing relationships to friend nodes of the user's node within the social graph and (b) one or more linked concept nodes within the entity graph expressly related to the user's node within the social graph or to the friends nodes of the users nodes or both, by
        (i) retrieving a list of entity objects representing the plurality of concepts within the entity graph of the social network system,
        (ii) filtering the retrieved list of entity objects by eliminating any entity object representing a linked concept expressly related to the user's node within the social graph,
        (iii) referencing a plurality of sub-concepts of the remaining entity objects within the filtered list of entity objects by accessing linked entity objects within the entity graph representing the plurality of sub-concepts, the linked entity objects expressly related to the entity objects, and
        (iv) querying the remaining entity objects within the filtered list of entity objects and the plurality of sub-concepts of the remaining entity objects for metadata of the respective entity objects, wherein the contextually relevant data is the metadata, and the plurality of concepts within the entity graph are not linked to the user's node within the social graph;
    identifying intersects between the plurality of concepts within the entity graph and the social relevant data for the user's node within the social graph;
    selecting one of the plurality of concepts within the entity graph based on the intersects identified; and
    displaying the one of the plurality of concepts within the entity graph at a user interface associated with the user's node.

2. The method of claim 1:
    wherein the plurality of concepts within the entity graph of the social network system correspond to real-world concepts, places, and/or things and do not correspond to any user of the social network system; and
    wherein the user's node within the social graph of the social network system corresponds to a human user of the social network system.

3. The method of claim 1, wherein retrieving socially relevant data for the user's node within the social graph, comprises at least:
    querying for the socially relevant data of the user's node describing relationships to friend nodes of the user's node within the social graph, each of the friend nodes being another user node within the social graph of the social network system which is expressly linked to the first user's node;
    querying for the one or more linked concept nodes within the entity graph which are expressly related to the user's node within the social graph according to an express relationship between a user object representing the user's node within the social graph and an entity object within the entity graph representing the one or more linked concept nodes within the entity graph; and querying objects representing the friend nodes expressly linked to the first user's node for one or more friend linked concept nodes within the entity graph, each expressly linked to the respective friend nodes and not linked to the first user's node.

4. The method of claim 1, wherein identifying intersects between the plurality of concepts within the entity graph and the social relevant data for the user's node within the social graph, comprises:

querying entity objects representing the plurality of concepts for data in common with the socially relevant data retrieved for the user's node.

5. The method of claim 4, wherein the data in common between the plurality of concepts and the socially relevant data retrieved for the user's node, comprises:

any data element existing in two or more of:
(a) the entity objects representing the plurality of concepts which are not expressly linked to the user's node;
(b) friend objects representing the friend nodes of the user's node and expressly linked to the user's node; and
(c) linked entity objects representing the one or more linked concept nodes expressly related to a user's object representing the user's node.

6. The method of claim 5, wherein querying the entity objects representing the plurality of concepts for data in common with the socially relevant data retrieved for the user's node, comprises:

creating a joined table from: (a) the entity objects representing the plurality of concepts which are not expressly linked to the user's node, (b) friend objects representing the friend nodes of the user's node and expressly linked to the user's node, and (c) linked entity objects representing the one or more linked concept nodes expressly related to a user's object representing the user's node; and searching the joined table for redundant fields indicating the data in common between at least two or more of (a), (b), and (c).

7. The method of claim 1, wherein identifying intersects between the plurality of concepts within the entity graph and the social relevant data for the user's node within the social graph, comprises:

creating a common dataset from: (a) the entity objects representing the plurality of concepts which are not expressly linked to the user's node, (b) friend objects representing the friend nodes of the user's node and expressly linked to the user's node, and (c) linked entity objects to the friends objects representing the one or more linked concept nodes expressly related to the friends objects and not linked to the user's object representing the user's node; and querying for intersects in the common dataset between the friends objects, the linked objects to the friends objects, and the entity objects.

8. The method of claim 1, wherein selecting one of the plurality of concepts within the entity graph based on the intersects identified, comprises:

ranking the plurality of concepts according to their relationship to the user's node based on the interests identified; and selecting the highest ranked one of the plurality of concepts.

9. The method of claim 1, wherein selecting one of the plurality of concepts within the entity graph based on the intersects identified, comprises:

ranking the plurality of concepts according to global criteria for each of the respective plurality of concepts according to one or both of global reference counts for each of the respective plurality of concepts and global trending statistics for each of the respective plurality of concepts; and selecting the highest ranked one of the plurality of concepts.

10. The method of claim 1, wherein selecting one of the plurality of concepts within the entity graph based on the intersects identified, comprises:

creating a common dataset from: (a) the entity objects representing the plurality of concepts which are not expressly linked to the user's node, (b) friend objects representing the friend nodes of the user's node and expressly linked to the user's node, and (c) linked entity objects representing the one or more linked concept nodes expressly related to a user's object representing the user's node;

scoring the entries in the common dataset by applying a TF-IDF (Term Frequency-Inverse Document Frequency) utility to the common dataset, wherein the TF-IDF utility returns a score for each entry of the common dataset, wherein the scores increase proportionally for entries according to frequency of the entry in the common dataset offset by the frequency of the entry in the common dataset; and selecting the one of the plurality of concepts associated with the entry having the highest score.

11. The method of claim 1, wherein selecting one of the plurality of concepts within the entity graph based on the intersects identified, comprises:

scoring each of the plurality of concepts according to frequency of commonality with the socially relevant data retrieved for the user's node;

identifying preferred contextual relationship types for each of the plurality of concepts from a pre-determined list;

retrieving weighting values for the preferred contextual relationship types;

proportionally increasing the scoring of each of the plurality of concepts according to the retrieved weighting values for those of the plurality of concepts matching the preferred contextual relationship types; and selecting the one of the plurality of concepts associated with the entry having the highest score.

12. The method of claim 1, wherein displaying the one of the plurality of concepts within the entity graph at a user interface associated with the user's node, comprises:

building a display module to organize a layout of information associated with the one of the plurality of concepts for display at the user interface associated with the user's node; and displaying the display module via the user interface associate with the user's node;

navigating the user interface to a concept page for the displayed one of the plurality of concepts responsive to the user clicking the displayed concept at the user interface;

ranking event data representing one or more of page loads, link clicks, and mouse focus events, at the user interface in relation to the displayed concept at the user interface; and providing the tracking event data to a prediction module to refine the selecting of the one of the plurality of concepts, wherein the concepts associated with greater quantities of one or more of the page loads, link clicks, and mouse focus events are weighted greater for selection over those concepts associated with fewer quantities of one or more of the page loads, the link clicks, and the mouse focus events.

13. The method of claim 1:
wherein selecting the one of the plurality of concepts within the entity graph based on the intersects identified comprises selecting the one of the plurality of concepts based on the user's node exhibiting a high degree of contextual relation to the one of the plurality of selected concepts;
wherein the one of the plurality of selected concepts includes information having a confidence value below a threshold allowing global display of the information with display of a page view for the selected concept;
wherein the method further comprises:
displaying the page view for the selected concept to the user interface with the further display of the information having the confidence value below the threshold allowing global display of the information; and
querying the user at the user interface to affirmatively verify or refute the information displayed having the confidence value below the threshold allowing global display.

14. The method of claim 13:
wherein the user affirmatively verifying the information displayed having the confidence value below the threshold allowing global display increases the confidence value for the information; and
wherein the user refuting the information displayed having the confidence value below the threshold allowing global display decreases the confidence value for the information.

15. A non-transitory computer readable storage medium having instructions stored thereon that, when executed by a processor of a social network system, the instructions cause the social network system to perform operations comprising:
retrieving contextually relevant data for a plurality of concepts within an entity graph of the social network system;
retrieving socially relevant data for a user's node within a social graph of the social network system including (a) socially relevant data of the user's node describing relationships to friend nodes of the user's node within the social graph and (b) one or more linked concept nodes within the entity graph expressly related to the user's node within the social graph or to the friends nodes of the users nodes or both, by
(i) retrieving a list of entity objects representing the plurality of concepts within the entity graph of the social network system,
(ii) filtering the retrieved list of entity objects by eliminating any entity object representing a linked concept expressly related to the user's node within the social graph,
(iii) referencing a plurality of sub-concepts of the remaining entity objects within the filtered list of entity objects by accessing linked entity objects within the entity graph representing the plurality of sub-concepts, the linked entity objects expressly related to the entity objects, and
(iv) querying the remaining entity objects within the filtered list of entity objects and the plurality of sub-concepts of the remaining entity objects for metadata of the respective entity objects, wherein the contextually relevant data is the metadata, and the plurality of concepts within the entity graph are not linked to the user's node within the social graph;
identifying intersects between the plurality of concepts within the entity graph and the social relevant data for the user's node within the social graph;
selecting one of the plurality of concepts within the entity graph based on the intersects identified; and
displaying the one of the plurality of concepts within the entity graph at a user interface associated with the user's node.

16. A social network system, comprising:
a concept selector to retrieve contextually relevant data for a plurality of concepts within an entity graph of the social network system;
a user node selector to retrieve socially relevant data for a user's node within a social graph of the social network system including (a) socially relevant data of the user's node describing relationships to friend nodes of the user's node within the social graph and (b) one or more linked concept nodes within the entity graph expressly related to the user's node within the social graph or to the friends nodes of the users nodes or both, the user node selector to
(i) retrieve a list of entity objects representing the plurality of concepts within the entity graph of the social network system,
(ii) filter the retrieved list of entity objects by eliminating any entity object representing a linked concept expressly related to the user's node within the social graph,
(iii) reference a plurality of sub-concepts of the remaining entity objects within the filtered list of entity objects by accessing linked entity objects within the entity graph representing the plurality of sub-concepts, the linked entity objects expressly related to the entity objects, and
(iv) query the remaining entity objects within the filtered list of entity objects and the plurality of sub-concepts of the remaining entity objects for metadata of the respective entity objects, wherein the contextually relevant data is the metadata, and the plurality of concepts within the entity graph are not linked to the user's node within the social graph;
a prediction engine to identify intersects between the plurality of concepts within the entity graph and the social relevant data for the user's node within the social graph;
the prediction engine to further select one of the plurality of concepts within the entity graph based on the intersects identified; and
a concept recommendation engine to transmit for display, the one of the plurality of concepts within the entity graph, to a user interface at a client device associated with the user's node communicatively interfaced to the social network system.

17. The non-transitory computer readable storage medium of claim 15,
wherein the plurality of concepts within the entity graph of the social network system correspond to real-world concepts, places, and/or things and do not correspond to any user of the social network system; and
wherein the user's node within the social graph of the social network system corresponds to a human user of the social network system.

18. The non-transitory computer readable storage medium of claim 15, wherein selecting one of the plurality of concepts within the entity graph based on the intersects identified, comprises:
- ranking the plurality of concepts according to global criteria for each of the respective plurality of concepts according to one or both of global reference counts for each of the respective plurality of concepts and global trending statistics for each of the respective plurality of concepts; and
- selecting the highest ranked one of the plurality of concepts.

19. The non-transitory computer readable storage medium of claim 15, wherein selecting one of the plurality of concepts within the entity graph based on the intersects identified, comprises:
- scoring each of the plurality of concepts according to frequency of commonality with the socially relevant data retrieved for the user's node;
- identifying preferred contextual relationship types for each of the plurality of concepts from a pre-determined list;
- retrieving weighting values for the preferred contextual relationship types;
- proportionally increasing the scoring of each of the plurality of concepts according to the retrieved weighting values for those of the plurality of concepts matching the preferred contextual relationship types; and
- selecting the one of the plurality of concepts associated with the entry having the highest score.

\* \* \* \* \*